S. I. ANDRESS.
STEERING INDICATOR.
APPLICATION FILED NOV. 2, 1909.

969,084.

Patented Aug. 30, 1910.

Witnesses
L. B. James
John A. Donegan

Inventor
Samuel I. Andress
By Chandler & Chandler
Attorneys

UNITED STATES PATENT OFFICE.

SAMUEL I. ANDRESS, OF MACKINAC ISLAND, MICHIGAN.

STEERING-INDICATOR.

969,084.  Specification of Letters Patent.  Patented Aug. 30, 1910.

Application filed November 2, 1909. Serial No. 525,954.

*To all whom it may concern:*

Be it known that I, SAMUEL I. ANDRESS, a citizen of the United States, residing at Mackinac Island, in the county of Mackinac, State of Michigan, have invented certain new and useful Improvements in Steering-Indicators; and I do hereby declare the following to be a full, clear, and exact description of the invention, such as will enable others skilled in the art to which it appertains to make and use the same.

This invention relates to improvements in steering indicators and has particular reference to a device of that kind to be located in the pilot house of a ship and attached to that portion of the steering mechanism located in the pilot house and serving to indicate the position of the rudder with reference to the fore-and-aft or longitudinal central line of a ship.

It has for its object the provision of a device which may be readily applied to most forms of steering wheels.

With these and other objects in view as will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size and minor details of the device may be made without departing from the spirit or sacrificing any of the advantages of the invention.

Figure 1:
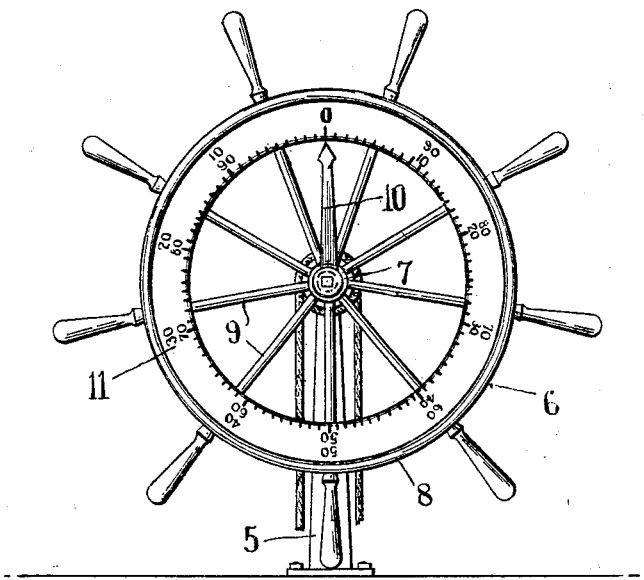
Figure 2:
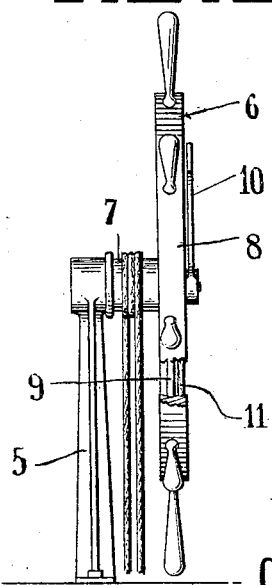

In the accompanying drawings forming part of the specification:—Figure 1 is a front elevation of the device showing its application to a steering wheel and the mount of the wheel. Fig. 2 is a side elevation of the device and also showing the steering wheel and mount in side elevation.

Similar numerals of reference are employed to designate corresponding parts throughout.

The mount of the steering wheel is designated in general by the numeral 5. This member has journaled in its upper end the usual drum upon which the tiller ropes are coiled, one end portion of the drum having fixedly secured thereto the steering wheel 6. The latter is of well known construction and includes a hub 7 and rim 8, the hub and rim being connected by a plurality of spokes 9, the terminals of which extend beyond the periphery of the rim and form handle grips for the helmsmen. Rising from that end of the mount 5 adjacent the steering wheel 6 is an indicator hand 10, the upper end of which lies in a plane with the periphery of the rim 8, or substantially so.

Fixedly secured to that face of the rim 8 adjacent the indicator hand is an annulus 11. This member is preferably of metal and corresponds in diameter to the rim 8. The outer face of the annulus is provided with a pair of concentric degree scales, the whole number of degrees in each scale corresponding to the number of degrees in a quadrant. The markings on the inner scale extend in clock-wise direction from zero to 90 degrees while those on the outer scale extend from zero in the opposite direction. Both scales have a common zero point so that when it is desired to turn the ship to starboard the steering wheel is turned to port and since the inner scale contains the port readings the helmsmen can ascertain by looking at the indicator hand the exact angle between the ship's rudder and central line of the ship. Thus it will be seen when the order is given to turn the helm to port or starboard a certain number of degrees, the helmsmen can accurately carry out the order by turning the helm the required number of degrees and in the direction ordered.

What is claimed as new, is:—

A steering indicator comprising a steering wheel, a stationary indicator arm mounted on the axle of said steering wheel, a flat annulus arranged on that side of said wheel adjacent the indicator arm, said annulus having on its outer face a plurality of circular concentric scales of degree markings, the order of marking of each scale extending in a direction opposite the order of marking of the adjoining scale.

In testimony whereof, I affix my signature, in presence of two witnesses.

SAMUEL I. ANDRESS.

Witnesses:
S. G. McGULPIN,
PATRICK McCORMICK.